Patented July 15, 1952

2,603,586

UNITED STATES PATENT OFFICE 2,603,586

RADIOPAQUE FORMULATION

Heron O. Singher, Plainfield, and Charles R. Harmison, Jr., Somerville, N. J., assignors to Ortho Pharmaceutical Corporation, a corporation of New Jersey No Drawing. Application July 8, 1950, Serial No. 172,773

2 Claims. (Cl. 167—95)

This invention relates to the combination for extravenous injection of an excretory contrast urographic medium and an enzyme capable of reducing the viscosity of mucopolysaccharides.

Enzymes which reduce the viscosity of mucopolysaccharides have been known for a number of years and one such specific enzyme, hyaluronidase, has been isolated from mammalian testicular tissue in a concentrated form. It is known that hyaluronidase enhances diffusion of therapeutic substances injected subcutaneously in tissues by modifying the permeability of tissue in vivo. Recent experiments suggest that hyaluronidase functions to accomplish the dissolution by depolymerization of intracellular cement which contains hyaluronic acid. Various types of decomposition products of hyaluronic acid have been identified, including monosaccharides such as glucuronic acid and N-acetyl-glucosamine, as well as oligosaccharides of varying molecular weights.

Many radiopaque contrast media are known which may be successfully used in contrast urography. 3-acetylamino-2,4,6-triiodobenzoic acid has received acceptance as an excellent contrast medium when used for intravenous injection and satisfactory results have been obtained when this media has been used by extravenous injection. It is generally recognized that such a contrast medium, when injected subcutaneously, disappears from the site of injection at a slow rate and appears in the kidney and bladder after a substantial period of time. Disappearance from the site of injection is slow and so appearance of a contrast medium in the kidney and bladder is correspondingly slow. Concentration in the kidney and bladder is dependent upon the rapidity of disappearance from the site of injection and on the rate at which a contrast medium is excreted from the kidney into the bladder.

Difficulties have been experienced in obtaining rapidly a sufficiently high concentration of contrast media in the kidney to afford clearly outlined roentenograms. It is because of this difficulty that repeated attempts have been made to obtain radiopaque substances which when injected subcutaneously would provide detailed roentenograms when present in relatively small amounts in the kidney and bladder. Although a number of radiopaque substances have been obtained which have received acceptance by roentgenologists, there is still a need for the provision of means whereby roentenograms of the kidney can be obtained which would show the calyces, pelves, and ureters more clearly outlined in the roentenograms using small amounts of radiopaque substance and diluent.

A publication in the American Journal of Roentgenology volume 61, pages 91–94 (1949), entitled: The effect of Hyaluronidase on the Absorption of Subcutaneously Deposited Radiopaque Substance, discloses that when mixtures of hyaluronidase and either one of disodium N - methyl - 3,5 - diiodo - chelidamate or diiodopryridone acetic acid diethanolamine are injected subcutaneously in guinea pigs, there is no absorption hastening effect of the combination over either one of the radiopaque substances injected alone. This publication also discloses that there is an absorption hastening effect if hyaluronidase is injected into guinea pigs subcutaneously at least twenty minutes before injection at the same site of either one of the particular radiopaque substances.

It is an object of this invention to provide a combination of an excretory contrast urographic medium and an enzyme capable of reducing the viscosity of mucopolysaccharides, which when simultaneously injected extravenously, has the property of disappearing from the site of injection at such a rate as to be carried to the kidney with sufficient rapidity and excreted in a concentration sufficiently high that the calyces, pelves, and ureters, are clearly outlined in a roentenogram.

Other objects will be apparent from the following description and appended claims.

It has now been discovered that a combination of a water-soluble salt of 3-acetylamino-2,4,6-triiodobenzoic acid and hyaluronidase in an aqueous solution may be injected extravenously and subcutaneously in particular and that the radiopaque substance will rapidly disappear from the site of injection and be excreted in the kidney in a sufficiently high concentration that the calyces, pelves, and ureters are clearly outlined in a roentenogram. Water-soluble salts of 3-acetylamino-2,4,6-triiodobenzoic acid are manufactured and sold by Mallinkrodt Chemical Works, St. Louis, Missouri, under the registered trade-mark Urokon.

Any water-soluble salt of 3-acetylamino-2,4,6-triiodobenzoic acid, including ammonium and trimethylammonium salts, is suitable for use in combination with hyaluronidase but salts of alkali metals are preferred and the sodium salt is specifically preferred.

An aqueous solution of the sodium salt of 3-acetylamino-2,4,6-triiodobenzoic acid in a concentration of 1 to 30 per cent by weight and containing at least 5 units of hyaluronidase per 1.5 cc. of solution will rapidly disappear from the site of subcutaneous injection and afford excellent roentenograms of the kidney. Enhancement of the rate of absorption of the sodium salt of 3-acetylamino-2,4,6-triodobenzoic acid and disappearance from the site of injection is proportional to the amount of hyaluronidase dissolved in the solution.

For a substantial increase in the rate of absorption and disappearance from the site of subcutaneous injection approximately 5 units of hyaluronidase in each 1.5 cc. of 5 per cent by weight aqueous solution of the sodium salt 3-acetylamino-2,4,6-triiodobenzoic acid is effective.

The following examples are given to illustrate specific embodiments of the invention, but it is not intended that the scope of the invention be delineated thereby but only by the breadth of the appended claims.

Example I

Six guinea pigs were each injected in the subscapular region on the ventral surface with an aqueous solution containing 15 turbidity reducing units of hyaluronidase and 1 cc. of a 30 per cent by weight aqueous solution of the sodium salt of 3-acetylamino-2,4,6-triiodobenzoic acid. The radiopaque substance had completely disappeared from the site of injection in all cases after 30 to 40 minutes and first appeared in the bladder after 15 to 20 minutes. Roentenograms were made of the site of injection and bladder at 5 minute intervals beginning 10 minutes after the injection. The roentenograms showed all parts of the kidney and bladder clearly outlined.

Example II

Six guinea pigs were each injected subcutaneously with 1 cc. of 30 per cent by weight of the sodium salt of 3-acetylamino-2,4,6-triiodobenzoic acid. Roentenograms were made at 10 minute intervals beginning 10 minutes after the injection. The radiopaque substance disappeared from the site of injection in 70 to 90 minutes and first appeared in the bladder in 60 to 70 minutes.

Example III

Six guinea pigs were each injected with 0.5 cc. of aqueous solution containing 0.5 turbidity reducing units of hyaluronidase and reinjected 20 minutes later at the same site of injection with 1 cc. of a 30 per cent aqueous solution of the sodium salt of 3-acetylamino-2,4,6-triiodobenzoic acid. Roentenograms were made at 10 minute intervals beginning 10 minutes after injection of the radiopaque substance and it was found that the radiopaque substance disappeared from the site of injection in 50 to 60 minutes and first appeared in the bladder in 40 to 50 minutes.

One reducing unit of hyaluronidase is defined according to Madinaveitia and Quibel, Biochemical Journal, volume 34, page 625 (1940), and volume 35, page 456 (1941), as represented by a preparation of which 1 milligram will reduce the viscosity of hyaluronic acid to one half its initial viscosity in 20 minutes.

What is claimed is:

1. A combination for simultaneous extravenous injection of an excretory contrast urographic medium and an enzyme capable of reducing the viscosity of mucopolysaccharides characterized by rapid disappearance of the medium from the site of injection, rapid appearance of the medium in the kidneys and bladder, and provision of clearly outlined roentenograms of the kidney and bladder comprising, an aqueous solution of a water-soluble salt of 3-acetylamino-2,4,6-triiodobenzoic acid and hyaluronidase.

2. The combination according to claim 1 in which the water-soluble salt is the sodium salt of 3-acetylamino-2,4,6-triiodobenzoic acid.

HERON O. SINGHER.
CHARLES R. HARMISON, Jr.

REFERENCES CITED

The following references are of record in the file of this patent:

UNITED STATES PATENTS

| Number | Name | Date |
|---|---|---|
| 2,160,413 | Dohrn | May 30, 1939 |
| 2,488,564 | Singher | Nov. 22, 1949 |

OTHER REFERENCES

American Journal of Roentgenology, vol. 61, pages 91 to 94 (1949), 167/95.